United States Patent [19]

White et al.

[11] Patent Number: 4,624,676
[45] Date of Patent: Nov. 25, 1986

[54] ORGANOSILOXANE POLYMERS FOR TREATMENT OF FIBRES THEREWITH

[75] Inventors: James W. White; Stephen Westall, both of Barry; Brian J. Griffiths, Coytrahen, all of Wales

[73] Assignee: Dow Corning, Ltd., Barry, Wales

[21] Appl. No.: 813,807

[22] Filed: Dec. 27, 1985

Related U.S. Application Data

[62] Division of Ser. No. 546,793, Oct. 31, 1983, Pat. No. 4,599,438.

[30] Foreign Application Priority Data

Nov. 16, 1982 [GB] United Kingdom ............... 8232646

[51] Int. Cl.$^4$ ........................................... D06M 15/00
[52] U.S. Cl. ................................ 8/115.56; 556/439; 252/8.6; 252/8.9
[58] Field of Search ..................... 556/439; 8/115.56

[56] References Cited

U.S. PATENT DOCUMENTS

| 2,875,177 | 2/1959 | Bluestein | 556/439 |
| 3,177,178 | 4/1965 | Bluestein | 556/439 |
| 3,318,843 | 5/1967 | Bluestein | 556/439 |
| 3,715,377 | 2/1973 | Siciliano | 556/439 |
| 3,729,444 | 4/1973 | Bey et al. | 556/439 |
| 3,828,087 | 8/1974 | Pittman et al. | 556/439 |

FOREIGN PATENT DOCUMENTS

| 0839374 | 6/1960 | United Kingdom. |
| 0950892 | 2/1964 | United Kingdom. |
| 1175120 | 12/1969 | United Kingdom. |
| 1425858 | 2/1976 | United Kingdom. |

*Primary Examiner*—Prince E. Willis
*Assistant Examiner*—John F. McNally
*Attorney, Agent, or Firm*—George A. Grindahl

[57] ABSTRACT

Novel organosiloxanes containing units of the formula

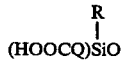

in which Q represents a divalent group composed of carbon and hydrogen, and optionally oxygen or sulphur, and R represents a monovalent hydrocarbon group, the organosiloxanes also containing at least two silicon-bonded substituents selected from hydrogen atoms, alkoxy groups and alkoxyalkoxy groups. The organosiloxanes can be applied to textile fibres, optionally in conjunction with crosslinking agents and catalysts, to impart thereto resistance to soiling by oily substances.

4 Claims, No Drawings

ORGANOSILOXANE POLYMERS FOR TREATMENT OF FIBRES THEREWITH

This is a divisional of co-pending application Ser. No. 546,793 filed on 10-31-83, now U.S. Pat. No. 4,599,438.

This invention relates to novel organosiloxanes and to the treatment of fibres therewith.

The treatment of textile fibres with organosiloxanes to impart such properties as water repellency, lubricity and soft handle is now well known. For example the application to textiles of aminosiloxanes or of mixtures of polydimethylsiloxanes and poly(methylhydrogen)-siloxanes imparts such desirable properties as crease-resistance and soft handle. However, it has been found that the treated fibres exhibit poor resistance to soiling by oily substances and to the redeposition of the oily soil during laundering.

It has been disclosed in U.K. Pat. No. 1 175 120 that the dry soiling of fibres may be reduced if there is applied to the fibres a colloidal suspension of a solid silsesquioxane having the unit formula $RSiO_{3/2}$ wherein 5 to 100 percent of the R groups are substituted hydrocarbon radicals in which the substituent is, for example, an epoxy, amino, mercapto or carboxyl group. The said U.K. patent does not disclose whether or not the treatment is effective in reducing oily soiling, that is soiling by fats and other organic oily substances.

In U.K. Pat. Nos. 839 374 and 950 892 it is disclosed that siloxanes having silicon-bonded carboxyalkyl groups and the polyvalent metal salts of such siloxanes can be used as impregnating agents for fabrics to impart water repellency. U.K. Pat. No. 1 425 858 discloses a textile finishing composition which comprises from 50 to 99 percent by weight of a creaseproofing resin and from 1 to 50 percent by weight of a carboxy functional siloxane.

The present invention is concerned with novel carboxy-functional siloxanes which can be applied to textile fibres to provide thereon a silicone finish having improved resistance to oily soiling and which is durable to laundering.

According to the invention there are provided organosiloxanes represented by the general formula $$[R'R_2SiO_{0.5}]_2[R''(CH_3)SiO]_a[R_2SiO]_b[(HOOCQ)SiO]_c$$
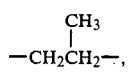

wherein Q represents a divalent group attached to silicon through a silicon to carbon bond and selected from hydrocarbon groups, groups composed of carbon, hydrogen and oxygen, and groups composed of carbon, hydrogen and sulphur, each R represents a monovalent hydrocarbon group having less than 19 carbon atoms, at least 50 percent of the total R groups being methyl, each R' represents a hydrogen atom, an alkoxy or alkoxyalkoxy group having less than 7 carbon atoms, a monovalent hydrocarbon group having less than 19 carbon atoms or the group —QCOOH, except that R' may not represent a monovalent hydrocarbon group or the group —QCOOH when a is 0, R" represents a hydrogen atom or alkoxy or alkoxyalkoxy group having less than 7 carbon atoms, a is 0 or an integer, b is 0 or an integer and c is an integer having a value up to $$\frac{a+b+c+2}{3}$$

there being present in the molecule at least two silicon-bonded substituents selected from the hydrogen atom, alkoxy groups having less than 7 carbon atoms and alkoxyalkoxy groups having less than 7 carbon atoms.

In addition to the units specified hereinabove the organosiloxanes of this invention may contain small amounts of chain branching units e.g. $RSiO_{1.5}$ and $SiO_2$ units. The organosiloxanes are therefore linear or substantially linear polymers which are characterised by the presence of both carboxy-functional groups and silicon-bonded hydrogen atoms, alkoxy groups or alkoxy-alkoxy groups. They may vary in molecular size from three up to at least several hundred siloxane units, organosiloxanes wherein the sum of $a+b+c$ lies in the range from about 100 to about 500 being preferred when intended for application to textile fibres as described herein.

In the general formula of the organosiloxanes the divalent group Q that links the carboxyl group to silicon may be for example $-CH_2CH_2-$, $-(CH_2)_3-$,

$-CH_2CH(CH_3)CH_2-$, $-CH_2CH_2OCH_2-$ or $-CH_2CH_2SCH_2-$. Preferably Q has from 2 to 8 carbon atoms. At least 50 percent of the total R groups are methyl groups with any remaining R substituents being higher monovalent hydrocarbon groups for example ethyl, propyl, 2,4,4-trimethylpentyl, vinyl, allyl and phenyl: the preferred organosiloxanes being those wherein each R represents the methyl group. Examples of R' and R" substituents are hydrogen, methoxy, ethoxy, butoxy, methoxyethoxy and ethoxyethoxy, the hydrogen atom, methoxy and ethoxy groups being preferred. When a is an integer R' may additionally represent a monovalent hydrocarbon group e.g. methyl, ethyl, butyl, vinyl or phenyl or the group —QCOOH. The carboxy groups and alkoxyalkoxy groups may thus be present on the terminal silicon atoms or pendant in the polymer chain or both.

The organosiloxanes of this invention wherein R' and R" are hydrogen may be prepared by the equilibration of the corresponding cyclic siloxanes and an appropriate source of end-stopping units e.g. a disiloxane. For example when the R' substituents are hydrogen atoms and a is zero the organosiloxanes may be prepared by the equilibration of

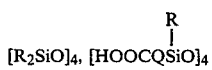

and tetramethyldisiloxane. Organosiloxanes wherein a is an integer and R" is hydrogen can be produced by a similar equilibration procedure in which the disiloxane is replaced by a triorganosiloxy end stopped poly(organohydrogen)siloxane. Equilibration procedures are generally known in the silicone art but, as far as is known, have not been previously employed for the manufacture of the organosiloxanes of this invention. Organosiloxanes wherein R' and R" are alkoxy or alkoxyalkoxy groups can be obtained from the corresponding SiH containing organosiloxanes by conversion of the SiH groups employing the appropriate alcohol. When R' represents an alkoxy group the organosiloxanes can also be prepared by the reaction of an alkoxy-terminated polyorganosiloxane having pendant silicon-bonded vinyl groups with e.g. mercaptoacetic acid. Such a reaction can be carried out in the presence of a free radical catalyst such as azobisisobutyronitrile.

The organosiloxanes of this invention may be cross-linked through the silicon-bonded reactive (R' and R") groups and may thus be employed for the production of cured coatings on a variety of substrates. They are of particular interest in the treatment of textile fibres to impart thereto a silicone finish which is less susceptible to oily soiling than that produced by more conventional silicones, for example the polydimethylsiloxanes. Thus the organosiloxanes may be applied to textile fibres in conjunction with other silicone finishes to improve the resistance of the finish to staining by oily substances and reduce the degree of redeposition of oily soil during laundering. Alternatively the organosiloxanes may be employed as the sole silicone component of the finish. Due to the presence of the reactive R' and R" groups the organosiloxanes have the ability to self-crosslink or chain extend, or to function as crosslinking agents for other silicone components of the treating composition, for example polyorganosiloxanes having silicon-bonded hydroxyl groups. If desired, however, the organosiloxanes may be employed in conjunction with other organosilicon crosslinking agents, for example silanes and siloxanes containing alkoxy groups.

Siloxane curing catalysts are preferably employed to expedite the crosslinking/curing of the organosiloxanes. A variety of substances are known which will catalyse the curing of siloxanes via the reaction of groups such as SiH, Si alkoxy and SiOH. Such substances include organic and mineral acids, bases e.g. amines, and metal organic compounds e.g. alkyl titanates, titanium chelates and metal carboxylates, the preferred catalysts being the tin carboxylates, for example dibutyltin dilaurate, dibutyltin dioctoate and stannous octoate. The catalysts may be used in conventional proportions, that is from about 0.1 to 7.5% by weight based on the total content of siloxanes in the applied composition.

The organosiloxanes of this invention may be employed to treat a variety of textile fibres, for example cotton, polyester, acrylic and nylon. The fibres may be treated in any form e.g. as monofilaments, yarns, random fibres, fabrics and finished articles. The organosiloxanes may be applied to the fibres from an organic solvent solution or from an aqueous dispersion or emulsion employing any suitable application technique, for example by spraying or total immersion. Application from aqueous emulsion is generally preferred as it avoids the need for expensive solvent recovery procedures during application. The proportion of organosiloxane applied to the fibres is not narrowly critical and will depend to some extent on the degree of stain resistance desired and on the proportion of silicon atoms in the organosiloxane bearing —QCOOH groups. In general the preferred level of application is from about 0.5 to 5% by weight of organosiloxane based on the weight of the fibres. Less than 0.5% may be employed where a lower degree of stain resistance is acceptable. More than 5% can be used but is uneconomic and does not necessarily result in any significant further increase in stain resistance.

Following the application of the organosiloxane the fibres are dried and the organosiloxane cured. Curing times and temperatures which are conventional for siloxane textile fibre treatments can be used, from 10 minutes to 10 seconds at 100° to 200° C. being normally sufficient.

The following examples in which Me represents methyl, Et represents ethyl and Vi the vinyl group illustrate the invention.

EXAMPLE 1

Octamethylcyclotetrasiloxane (1000 g), a 90 percent by weight solution in toluene of the cyclic siloxane [(Me)(HOOCCH$_2$SCH$_2$CH$_2$)SiO]$_4$ (314 g) and tetramethyldisiloxane (20.6 g) were heated together to 80° C. under a nitrogen atmosphere. Trifluoromethane sulphonic acid (1.32 g) was then added and the heating continued (80°–91° C.) for four hours. During this period the mixture became clear and homogenous.

The catalyst was neutralised and the product cooled and filtered to provide a clear, pale straw-coloured liquid having a viscosity of 1510 cS at 25° C. and the average structure HMe$_2$SiO[Me$_2$SiO]$_{88}$[MeSiO]$_{10}$SiMe$_2$H
|
CH$_2$
|
CH$_2$SCH$_2$COOH

|         | found | calculated |
|---------|-------|------------|
| % COOH  | 5.40  | 5.22       |
| % SiH   | 0.57  | 0.67       |

EXAMPLE 2

Reactants:

EtO [Me$_2$SiO]$_{97}$ [MeViSiO]$_3$ SiMe$_2$(OEt)    (I)

HSCH$_2$COOH    (II)

A solution of I (417 g) in toluene (104 g) was heated to 90° C. and a solution of II (13.8 g) and azobisisobutyronitrile (0.42 g) in toluene (13.8 g) added slowly to it. When the addition was complete the temperature was raised to 100° C. and held for 4 hours, a further quantity (0.42 g) of azobisisobutyronitrile being added after 2 hours. Volatiles were removed by vacuum distillation (108° C./80 mbar) and the product filtered to give a slightly hazy liquid having a viscosity of 684 cS at 25° C. and the average structure:

EtO[Me$_2$SiO]$_{97}$[MeSiO]$_3$SiMe$_2$(OEt)
|
CH$_2$
|
CH$_2$SCH$_2$COOH

EXAMPLE 3

An organosiloxane having the average structure

HMe$_2$Si(OSiMe$_2$)$_{143.5}$(OSiMe)$_{4.5}$OSiMe$_2$H
|
CH$_2$
|
CH$_2$SCH$_2$COOH was prepared according to the procedure described in Example 1 and 100 g emulsified in water (300 ml) employing a mixture of octylphenylpolyether alcohols (10 g) as the emulsifying agent.

To the aqueous oil in water emulsion was added 5 g of a 20 percent by weight emulsion of dibutyltin bis(lauryl mercaptide) as catalyst and the resulting emulsion applied by padding to pieces of 65/35 polyester-cotton shirt fabric (undyed and scoured) to a pick up of 1 percent by weight organosiloxane. The treated fabric was dried at 80° C. for 10 minutes and then exposed to 190° C. for 30 seconds in a laboratory stenter to cure the applied organosiloxane. This was designated Sample A.

For comparison, pieces of the same fabric were treated as above except that there was employed a commercial silicone textile treating emulsion containing a hydroxyl-terminated polydimethylsiloxane, a poly(methylhydrogen)siloxane and a catalyst. This is referred to as Sample B.

Both samples, together with a sample of untreated fabric were tested for their resistance to creasing according to BS 3086:1972 (warp direction only). The values obtained for the crease recovery angles were as follows:

| Untreated | 95° |
|---|---|
| Sample A | 113° |
| Sample B | 118° |

Both Sample A and Sample B exhibited a smoother and softer handle than the untreated fabric.

The resistance of the samples to soiling by oily substances was then measured. Approximately 0.5 ml portions of melted butter, liquid paraffin, olive oil and mayonnaise were applied individually to the samples and allowed to set for 18 hours. The soiled samples were then laundered in a domestic front loading washing machine at a temperature of 60° C. employing normal polyester/cotton washing conditions and a commercially available detergent.

After drying, the degree of soil removal was determined by comparison with the AATCC Stain Release Replica, the scale of values ranging from 1 (no soil removal) to 5 (total soil removal).

| | Butter | Liquid Paraffin | Olive Oil | Mayonnaise |
|---|---|---|---|---|
| Untreated | 2.75 | 2.5 | 3.5 | 2.75 |
| Sample A | 4.0 | 3.25 | 4.25 | 3.75 |
| Sample B | 2.75 | 1.0 | 3.0 | 1.75 |

EXAMPLE 4

An organosiloxane having the average structure

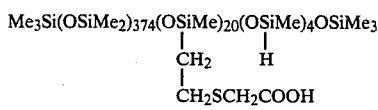

was prepared by an equilibration procedure similar to that described in Example 1, the tetramethyldisiloxane being replaced by a trimethylsiloxy-terminated poly(methylhydrogen) siloxane and hexamethyldisiloxane.

100 g of the organosiloxane was emulsified in water (300 g) employing a mixture of octylphenylpolyether alcohols (10 g) as the emulsifying agent. To the emulsion was then added 20 g of a 20% by weight emulsion of dibutyltin bis(laurylmethcaptide) and methyl trimethoxysilane (10 g). The resulting mixture was diluted with water and applied from a pad bath to pieces of 65/35 polyester-cotton fabric (undyed and scoured) to a pick-up of 1% by weight of the organosiloxane. After drying at 80° C. for 10 minutes the fabric was then exposed to 190° C. for 30 seconds in a laboratory stenter to cure the organosiloxane. This sample was designated Sample C.

For comparison pieces of the same fabric were similarly treated with a commercial silicone textile treating emulsion of the kind used and described in Example 3. This was designated Sample D. Both samples, together with a piece of untreated fabric, were tested with respect to crease recovery and soil resistance employing the test methods described in Example 3. The results were as follows:

| | Crease Recovery Angle | Soil Release Rating | | | |
|---|---|---|---|---|---|
| | | Butter | Liquid Paraffin | Olive Oil | Mayonnaise |
| Untreated | 100° | 3.25 | 2.25 | 3.0 | 3.0 |
| Sample C | 117° | 4.0 | 3.25 | 3.75 | 4.0 |
| Sample D | 119° | 2.25 | 1.0 | 2.25 | 2.0 |

In order to evaluate the stain resistance of the fabric after laundering, pieces of treated and untreated fabric were washed five times at 60° C. in a domestic washing machine. The staining substances were then applied and the pieces of fabric washed again at 60° C. The soil release ratings for the washed samples were as follows:

| | Butter | Liquid Paraffin | Olive Oil | Mayonnaise |
|---|---|---|---|---|
| Untreated | 3.25 | 3.0 | 3.5 | 3.25 |
| Sample C | 3.5 | 3.5 | 3.75 | 4.0 |
| Sample D | 2.25 | 1.0 | 1.75 | 1.5 |

EXAMPLE 5

An organosiloxane having the average structure

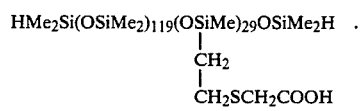

was prepared by an equilibration process of the kind described in Example 1.

Employing the procedure of Example 4 the organosiloxane was emulsified, mixed with dibutyltin di(laurylmercaptide) and methyltrimethoxysilane and the resulting composition applied to 65/35 polyester-cotton fabric. The soil resistance of a treated sample (Sample E) was compared with that of a sample treated with a conventional silicone composition (Sample F) and an untreated sample as described in Example 3. The ratings obtained were as follows, figures in parentheses indicating the values obtained on samples which had been laundered five times at 60° C. prior to staining.

|  | Butter | Liquid Paraffin | Olive Oil | Mayonnaise |
|---|---|---|---|---|
| Untreated | 3.0(3.25) | 2.5(2.75) | 3.25(3.0) | 2.75(3.5) |
| Sample E | 3.25(3.25) | 3.75(3.0) | 4.25(4.0) | 4.0(3.5) |
| Sample F | 3.0(3.25) | 2.25(2.75) | 3.0(3.0) | 2.25(3.0) |

That which is claimed is:

1. A process for the treatment of textile fibers which consists essentially of applying to said textile fibers an organosiloxane represented by the general formula:

wherein Q represents a divalent group attached to silicon through a silicon to carbon bond and selected from hydrocarbon groups, groups composed of carbon, hydrogen and oxygen and groups composed of carbon, hydrogen and sulphur, each R represents a monovalent hydrocarbon group having less than 19 carbon atoms, at least 50 percent of the total R groups being methyl, each R' represents a hydrogen atom, an alkoxy or alkoxyalkoxy group having less than 7 carbon atoms, a monovalent hydrocarbon group having less than 19 carbon atoms or the group —QCOOH, except that R' may not represent a monovalent hydrocarbon group or the group —QCOOH when a is 0, R" represents a hydrogen atom or an alkoxy or alkoxyalkoxy group having less than 7 carbon atoms, a is 0 or an integer, b is 0 or an integer and c is an integer having a value up to $$\frac{a+b+c+2}{3},$$

there being present in the molecule at least two silicon-bonded substituents selected from the hydrogen atom, alkoxy groups having less than 7 carbon atoms and alkoxyalkoxy groups having less than 7 carbon atoms.

2. A process as claimed in claim 1 wherein the organosiloxane is applied to the fibres as an aqueous emulsion.

3. A process as claimed in claim 1 wherein the organosiloxane is applied to the fibres in conjunction with an organosilicon crosslinking agent.

4. A process as claimed in claim 1 wherein the organosiloxane is applied to the fibres together with a siloxane curing catalyst.

* * * * *